UNITED STATES PATENT OFFICE.

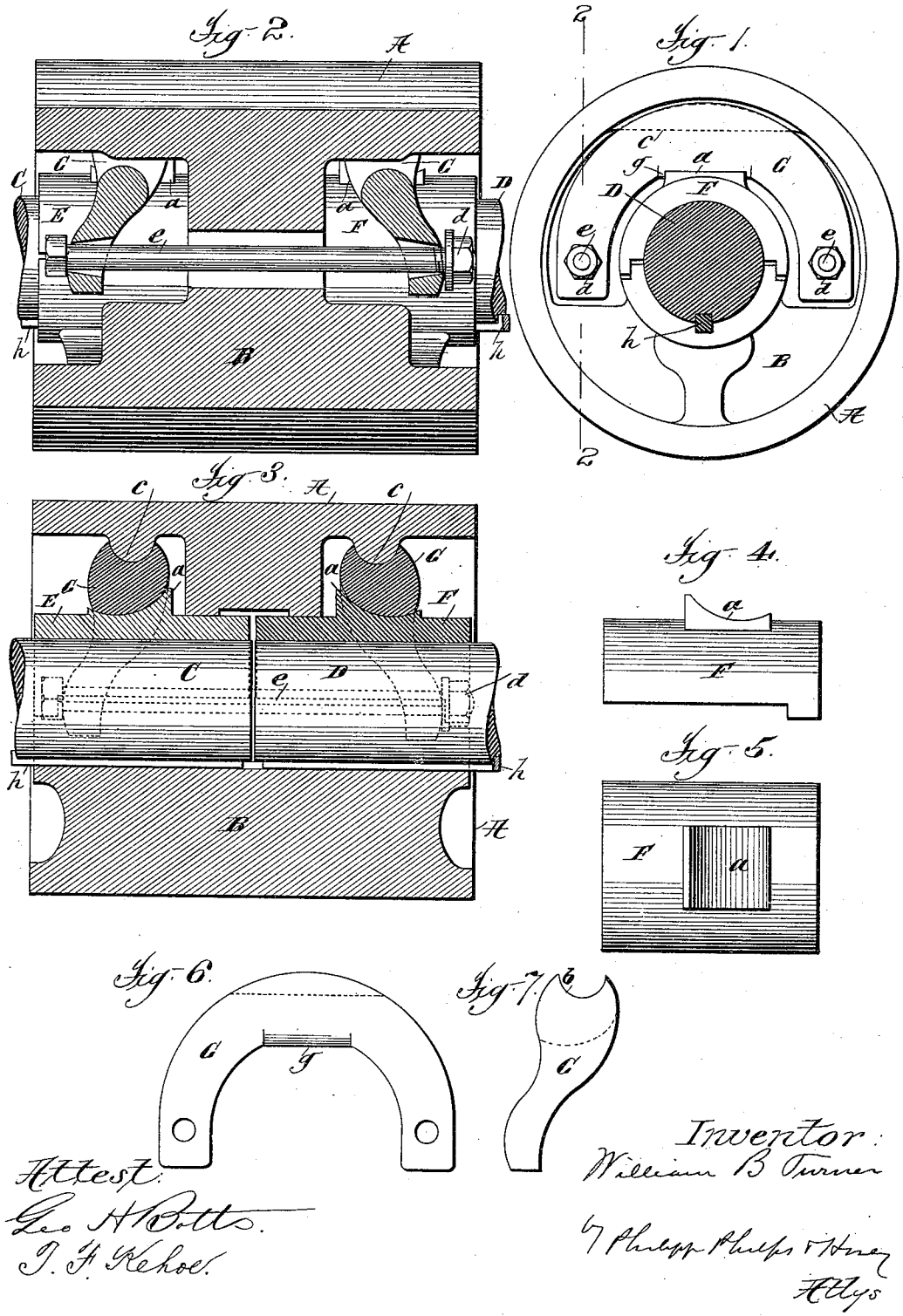

WILLIAM B. TURNER, OF SCHENECTADY, NEW YORK.

SHAFT-COUPLING.

SPECIFICATION forming part of Letters Patent No. 447,925, dated March 10, 1891.

Application filed September 20, 1890. Serial No. 365,605. (No model.)

*To all whom it may concern:*

Be it known that I, WILLIAM B. TURNER, a citizen of the United States, residing at Schenectady, county of Schenectady, and State of New York, have invented certain new and useful Improvements in Shaft - Couplings, fully described and represented in the following specification and the accompanying drawings, forming a part of the same.

This invention relates to improvements in shaft-couplings, the invention relating more particularly, however, to that class of shaft-couplings shown and described in my prior Letters Patent, No. 314,206, dated March 17, 1885, the shaft-coupling of the present invention differing, however, from that of said Letters Patent in the construction and arrangement of the cam-levers and operating-connections.

In the accompanying drawings, Figure 1 is an end view of a coupling embodying my invention. Fig. 2 is a vertical section on the line 2 2 of Fig. 1. Fig. 3 is a central vertical section of the same. Figs. 4, 5, 6, and 7 are detail views which will be hereinafter referred to.

Referring to said figures it will be understood that the body of the coupling consists of a preferably cylindrical tubular casing A, which encircles the shafts which are to be coupled. The casing A is provided with a bearing upon its interior for the abutting ends of a pair of shafts C D which are to be coupled. This bearing is made in two parts, one of which B is integral with or rigidly secured to the casing A and extends around about one-half of its inner circumference. The other part of the bearing consists of a pair of caps E F over the abutting ends of the shafts C D, respectively. These two caps rest upon the halves of their respective shafts which are not inclosed by the lower bearing B, with their edges in contact with the upper edges of the latter bearing, as shown in Fig. 1. Each of the caps E F is provided upon its outer surface with a seat *a*, preferably inclined, as shown, upon which rests the central cam-shaped under side *g* of a bifurcated lever G, the upper central portion of which is provided with a groove *b*, which receives a correspondingly-shaped rib *c*, formed upon the inner wall of the casing A. The construction of these several parts is shown in detail in Figs. 4 to 7. It is obvious that the positions of the groove *b* and rib *c* may be reversed—that is to say, the groove may be formed in the casing A and the rib upon the lever G, though the arrangement just described is the preferred form.

The two levers G are connected upon each side of the shafts C D by rods *e*, which pass through the bifurcated ends of the lever, a nut *d* being provided at the end of each rod, by turning which the ends of the levers D are drawn inwardly toward each other or permitted to move outwardly away from each other. The seats *a* upon the caps E F are inclined upwardly toward the center of the casing, and the seated portions of the levers G are inclined in an opposite direction, so that as the lower ends of the levers G are forced inwardly toward each other the cam-shaped portion of each lever rides up its inclined seat, thus forcing the caps E F down against the shafts C D and the bearing B, and thereby coupling the abutting ends of the shafts C D. For the purpose of giving the coupling a firmer hold upon the shafts the bearing B and the shafts C D may be recessed, so as to receive a key *h*.

The manner of assembling the parts of the apparatus and their operation are as follows: The casing A having been placed over the shafts C D so that the abutting ends of the latter rest upon the bearing B, the caps E F and levers G are then inserted through the ends of the casing A into the position in which they are shown in the drawings. The rods *e* are then passed through the inner ends of the levers G, the levers G upon opposite ends of the casing A being thus connected. Upon tightening the nuts *d* the inner ends of the levers G are drawn inwardly toward each other, the seated portions of the levers riding up the inclined seats *a*. As this movement of the levers continues, the caps E F are forced downward against the ends of the shafts C D and the bearing B.

This construction of coupling has the advantage over that of my prior Letters Patent before referred to of greater simplicity and durability. By thus fulcruming the levers upon the casing A and positioning the operating-connections between said levers inside the lines of engagement of their cam-surfaces with the movable bearing, or, in other words, upon opposite sides of said cam-surfaces with relation to the fulcrumed portions of said levers, a longer and better leverage is obtained, which renders the operation of the levers to couple the shafts comparatively easy, while the broad cam-surface of the levers and their correspondingly broad inclined seats provides for a considerable amount of wear of the contacting parts, the cam-surfaces of the levers and their seats being so shaped that a considerable amount of such wear may take place before the levers become inoperative Many changes may be made in the construction and arrangement of the several parts of the coupling just described without departing from the present invention. For example, the seats $a$, though shown and described as inclined inwardly toward each other, instead of being thus inclined may have plane surfaces, or they may be dispensed with altogether, the cam-surfaces of the levers G in the latter case engaging the caps E and F directly. Such latter constructions would operate satisfactorily in many cases; but the construction illustrated and heretofore described is, as before remarked, the preferred one, providing as it does a larger bearing-surface, and consequently a more durable and effective construction. If desired, also, the engaging portions $g$, instead of being cam-shaped, may be plain, their seats $a$ in this case being inclined, as shown, and providing the cam-surfaces for the movement of the caps E F. It is obvious, also, that the inner ends of the levers, instead of terminating as they do about opposite the central line of the shafts C D, may be slightly shorter or may be continued so as to form a complete circle about the shafts, one of the connecting-rods being dispensed with in this latter case and the single rod connnected to each lever at a point directly opposite its cam-surface. It is also obvious that that portion of the casing A which incloses the movable bearing may, instead of being solid, as shown, consist of ribs merely for engagement with the grooves $b$ upon the levers G. Such a construction, it is to be understood, is included within the term "casing" as employed in the foregoing description and in the following claims.

What I claim is—

1. In a shaft-coupling, the combination of a casing inclosing the shafts to be coupled, a bearing rigid with said casing, a bearing movable transversely to said casing and shafts, a pair of levers fulcrumed on the casing and engaging the movable bearing by cam-surfaces, and operating-connections between the levers inside the lines of engagement of their cam-surfaces with the movable bearing, substantially as described.

2. In a shaft-coupling, the combination of a casing inclosing the shafts to be coupled, a bearing rigid with said casing, a bearing movable transversely to said casing and shafts, a pair of levers, one lever straddling each shaft, said levers being fulcrumed on the casing and engaging the movable bearing by cam-surfaces, and operating-connections between the straddling portions of said levers, substantially as described.

3. In a shaft-coupling, the combination of a casing inclosing the shafts to be coupled, a bearing rigid with said casing, a bearing movable transversely to said casing and shafts, a pair of bifurcated levers, one lever straddling each shaft, said levers being fulcrumed upon the casing and engaging the movable bearing by cam-surfaces, and operating-connections between the inner ends of said levers, substantially as described.

4. In a shaft-coupling, the combination of a casing inclosing the shafts to be coupled, a bearing rigid with said casing and splined or otherwise secured to the shafts to be coupled, a bearing movable transversely to said casing and shafts, a pair of levers, one lever straddling each shaft, said levers being fulcrumed on the casing and engaging the movable bearing by cam-surfaces, and operating-connections between the straddling portions of said levers, substantially as described.

5. In a shaft-coupling, the combination of a casing inclosing the shafts to be coupled, a bearing rigid with said casing, a bearing movable transversely to said casing and shafts, the bifurcated levers G, fulcrumed on the casing and having cams $g$ engaging the movable bearing, and operating-connections between the inner ends of the levers, substantially as described.

6. In a shaft-coupling, the combination of a casing inclosing the shafts to be coupled, a bearing rigid with said casing, a bearing movable transversely to said casing and shafts, the bifurcated levers G, fulcrumed on the casing and having cams $g$ engaging the movable bearing, inclined seats $a$ upon the movable bearing for receiving said cams, and operating-connections between the inner ends of the levers, substantially as described.

7. In a shaft-coupling, the combination of a casing inclosing the shafts to be coupled, a bearing rigid with said casing, a bearing movable transversely to said casing and shafts, the bifurcated levers G, fulcrumed on the casing and straddling the shafts and having cams $g$ engaging the movable bearing, and rods $e$ and nuts $d$ upon the straddling ends of the levers for operating the same, substantially as described.

8. The combination, with the shafts C D, rigid bearing B, caps E F, and casing A, of the levers G, fulcrumed upon the casing and having cams $g$ engaging the caps E F, and operating-connections between the levers, substantially as described.

9. The combination, with the shafts C D, rigid bearing B, caps E F, and casing A, of the levers G, fulcrumed upon the casing and having cams $g$ engaging the caps E F, inclined seats $a$ upon said caps for receiving said cams, and operating-connections between the levers, substantially as described.

In testimony whereof I have hereunto set my hand in the presence of two subscribing witnesses.

WILLIAM B. TURNER.

Witnesses:
   A. WESTEE,
   L. O. WEBER.